United States Patent
Allen et al.

(10) Patent No.: US 9,819,973 B2
(45) Date of Patent: *Nov. 14, 2017

(54) EMBEDDED APPLIANCE FOR MULTIMEDIA CAPTURE

(71) Applicant: Echo 360, Inc., Reston, VA (US)

(72) Inventors: Geoffrey Benjamin Allen, Potomac Falls, VA (US); Steven Lee Geyer, Herndon, VA (US); Rodney Dale McElrath, Raleigh, NC (US)

(73) Assignee: Echo 360, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,144

(22) Filed: Jun. 29, 2015

(65) Prior Publication Data

US 2015/0304690 A1    Oct. 22, 2015

Related U.S. Application Data

(63) Continuation of application No. 13/912,944, filed on Jun. 7, 2013, now Pat. No. 9,071,746, which is a
(Continued)

(51) Int. Cl.
| | |
|---|---|
| *G06K 9/00* | (2006.01) |
| *H04N 21/2343* | (2011.01) |
| *H04N 1/00* | (2006.01) |
| *H04N 5/44* | (2011.01) |
| *H04L 29/06* | (2006.01) |
| *H04N 5/232* | (2006.01) |
| *H04N 21/242* | (2011.01) |
| *H04N 21/258* | (2011.01) |
| *H04N 21/2747* | (2011.01) |
| *H04N 21/422* | (2011.01) |

(Continued)

(52) U.S. Cl.
CPC ..... *H04N 21/2343* (2013.01); *H04L 65/1059* (2013.01); *H04L 65/602* (2013.01);
(Continued)

(58) Field of Classification Search
CPC .... H04N 21/2343; H04N 7/0102; H04N 7/10; H04N 21/458; H04N 21/443;
(Continued)

(56) References Cited

U.S. PATENT DOCUMENTS

| | | |
|---|---|---|
| 5,544,315 A | 8/1996 | Lehfeldt et al. |
| 5,734,843 A | 3/1998 | Gephardt et al. |

(Continued)

FOREIGN PATENT DOCUMENTS

| | | |
|---|---|---|
| CN | 1585471 A | 2/2005 |
| CN | 2679930 Y | 2/2005 |

(Continued)

OTHER PUBLICATIONS

Second Office Action for Chinese Application No. 201310271947.1, dated Jan. 14, 2016.
(Continued)

*Primary Examiner* — John Strege
(74) *Attorney, Agent, or Firm* — Cooley LLP

(57) ABSTRACT

A multimedia device includes input ports dedicated to receiving a real-time media signal and a processor system dedicated to capturing the real-time media signal. The processor system defines an embedded environment. The input ports and the processor system are integrated into the multimedia capture device. The input ports include an audio input port and at least one of a visual-capture input port or a digital-image input port.

15 Claims, 5 Drawing Sheets

Related U.S. Application Data continuation of application No. 13/305,180, filed on Nov. 28, 2011, now Pat. No. 8,503,716, which is a continuation of application No. 12/781,434, filed on May 17, 2010, now Pat. No. 8,068,637, which is a continuation of application No. 11/472,997, filed on Jun. 23, 2006, now Pat. No. 7,720,251.

(51) Int. Cl.
| | |
|---|---|
| *H04N 21/4223* | (2011.01) |
| *H04N 21/426* | (2011.01) |
| *H04N 21/43* | (2011.01) |
| *H04N 21/433* | (2011.01) |
| *H04N 21/4402* | (2011.01) |
| *H04N 21/443* | (2011.01) |
| *H04N 21/458* | (2011.01) |
| *H04N 21/475* | (2011.01) |
| *H04N 21/488* | (2011.01) |
| *H04N 21/6377* | (2011.01) |
| *H04N 21/6543* | (2011.01) |
| *H04N 21/658* | (2011.01) |
| *H04N 7/01* | (2006.01) |
| *H04N 7/10* | (2006.01) |
| *H04N 21/231* | (2011.01) |

(52) U.S. Cl.
CPC ..... *H04N 1/00127* (2013.01); *H04N 1/00281* (2013.01); *H04N 5/23203* (2013.01); *H04N 5/4448* (2013.01); *H04N 7/0102* (2013.01); *H04N 7/10* (2013.01); *H04N 21/242* (2013.01); *H04N 21/25875* (2013.01); *H04N 21/2747* (2013.01); *H04N 21/4223* (2013.01); *H04N 21/42203* (2013.01); *H04N 21/42692* (2013.01); *H04N 21/4307* (2013.01); *H04N 21/4334* (2013.01); *H04N 21/4402* (2013.01); *H04N 21/443* (2013.01); *H04N 21/458* (2013.01); *H04N 21/4753* (2013.01); *H04N 21/4882* (2013.01); *H04N 21/6377* (2013.01); *H04N 21/6543* (2013.01); *H04N 21/6582* (2013.01); *H04N 21/23109* (2013.01); *H04N 2201/3261* (2013.01); *H04N 2201/3264* (2013.01)

(58) Field of Classification Search
CPC ......... H04N 21/6543; H04N 21/42203; H04N 21/25875; H04N 21/4307; H04N 21/242; H04N 21/4334; H04N 21/4753; H04N 21/6582; H04N 21/4402; H04N 21/6377; H04N 21/2747; H04N 21/4223
USPC ....................................................... 382/100
See application file for complete search history.

(56) References Cited

U.S. PATENT DOCUMENTS

| | | | |
|---|---|---|---|
| 5,745,711 A * | 4/1998 | Kitahara | G06F 3/04842 715/753 |
| 6,067,624 A | 5/2000 | Kuno | |
| 6,104,430 A | 8/2000 | Fukuoka | |
| 6,177,950 B1 | 1/2001 | Robb | |
| 6,271,752 B1 | 8/2001 | Vaios | |
| 6,323,897 B1 | 11/2001 | Kogane et al. | |
| 6,473,846 B1 | 10/2002 | Melchior | |
| 6,564,380 B1 | 5/2003 | Murphy | |
| 6,628,325 B1 | 9/2003 | Steinberg et al. | |
| 6,653,609 B2 | 11/2003 | Ozawa et al. | |
| 6,698,021 B1 | 2/2004 | Amini et al. | |
| 6,789,228 B1 | 9/2004 | Merril et al. | |
| 6,803,945 B1 | 10/2004 | Needham | |
| 6,845,182 B2 | 1/2005 | Matsuo | |
| 6,876,668 B1 | 4/2005 | Chawla et al. | |
| 6,965,398 B2 | 11/2005 | Arakt | |
| 6,980,232 B2 | 12/2005 | Suzuki | |
| 7,075,568 B2 | 7/2006 | Aizawa | |
| 7,085,845 B2 | 8/2006 | Woodward et al. | |
| 7,099,309 B2 | 8/2006 | Davidson | |
| 7,149,973 B2 | 12/2006 | Dias et al. | |
| 7,154,538 B1 | 12/2006 | Fukasawa et al. | |
| 7,239,343 B2 | 7/2007 | Ohsawa et al. | |
| 7,272,845 B2 | 9/2007 | Creamer et al. | |
| 7,275,159 B2 | 9/2007 | Hull et al. | |
| 7,298,930 B1 | 11/2007 | Erol et al. | |
| 7,299,289 B1 | 11/2007 | Lorenz et al. | |
| 7,423,670 B2 | 9/2008 | Kawai et al. | |
| 7,425,987 B2 | 9/2008 | Creamer et al. | |
| 7,428,005 B2 | 9/2008 | Creamer et al. | |
| 7,446,801 B2 | 11/2008 | Iizuka | |
| 7,508,535 B2 | 3/2009 | Hart et al. | |
| 7,528,976 B2 | 5/2009 | Hart et al. | |
| 7,528,977 B2 | 5/2009 | Hull et al. | |
| 7,573,593 B2 | 8/2009 | Hart et al. | |
| 7,720,251 B2 * | 5/2010 | Allen | H04N 1/00127 348/211.11 |
| 7,730,407 B2 | 6/2010 | Chiu et al. | |
| 7,954,130 B2 | 5/2011 | Yanai | |
| 7,983,160 B2 * | 7/2011 | Gunatilake | H04N 21/23406 370/230 |
| 8,068,637 B2 * | 11/2011 | Allen | H04N 1/00127 348/211.11 |
| 8,220,045 B2 | 7/2012 | Conti et al. | |
| 8,503,716 B2 * | 8/2013 | Allen | H04N 1/00127 348/211.11 |
| 9,071,746 B2 * | 6/2015 | Allen | H04N 1/00127 |
| 2001/0017655 A1 | 8/2001 | Arakt | |
| 2001/0017656 A1 | 8/2001 | Araki et al. | |
| 2001/0027493 A1 | 10/2001 | Wallace | |
| 2002/0161980 A1 | 10/2002 | Nishikawa | |
| 2003/0067543 A1 | 4/2003 | Okada et al. | |
| 2003/0108105 A1 | 6/2003 | Morad et al. | |
| 2003/0189649 A1 | 10/2003 | Kuno | |
| 2004/0051787 A1 | 3/2004 | Mutsuro et al. | |
| 2004/0056964 A1 | 3/2004 | Kawai et al. | |
| 2004/0117427 A1 | 6/2004 | Allen et al. | |
| 2004/0158582 A1 | 8/2004 | Takagi et al. | |
| 2004/0183896 A1 | 9/2004 | Takamine et al. | |
| 2004/0198426 A1 | 10/2004 | Squibbs et al. | |
| 2004/0225743 A1 | 11/2004 | Huggins et al. | |
| 2005/0034057 A1 | 2/2005 | Hull et al. | |
| 2005/0050577 A1 | 3/2005 | Westbrook et al. | |
| 2005/0054285 A1 | 3/2005 | Mears et al. | |
| 2005/0055483 A1 | 3/2005 | Devlin et al. | |
| 2005/0068571 A1 | 3/2005 | Hart et al. | |
| 2005/0068572 A1 | 3/2005 | Hart et al. | |
| 2005/0071519 A1 | 3/2005 | Hart et al. | |
| 2005/0071520 A1 | 3/2005 | Hull et al. | |
| 2005/0071746 A1 | 3/2005 | Hart et al. | |
| 2005/0177624 A1 | 8/2005 | Oswald et al. | |
| 2005/0253851 A1 * | 11/2005 | Tsukamoto | G06Q 10/10 345/473 |
| 2006/0070105 A1 | 3/2006 | Kawai | |
| 2006/0136803 A1 | 6/2006 | Erol et al. | |
| 2006/0161960 A1 | 7/2006 | Benoit | |
| 2006/0230123 A1 | 10/2006 | Simmons et al. | |
| 2006/0253894 A1 | 11/2006 | Bookman et al. | |
| 2007/0065032 A1 | 3/2007 | Hernandez et al. | |
| 2012/0069207 A1 | 3/2012 | Allen et al. | |

FOREIGN PATENT DOCUMENTS

| | | |
|---|---|---|
| CN | 1755747 A | 4/2006 |
| JP | 08-331264 | 12/1996 |
| JP | 2002-135741 | 5/2002 |
| JP | 2002-140203 | 5/2002 |
| JP | 2002-271768 | 9/2002 |
| JP | 2004-187318 | 7/2004 |
| JP | 2004-259263 | 9/2004 |
| JP | 2004-266831 | 9/2004 |

(56) References Cited

FOREIGN PATENT DOCUMENTS

| | | |
|---|---|---|
| JP | 2005-109922 | 4/2005 |
| JP | 2006-033743 | 2/2006 |
| JP | 2006-040282 | 2/2006 |
| TW | 1242126 | 10/2005 |
| WO | WO 01/27763 A1 | 4/2001 |

OTHER PUBLICATIONS

Patent Examination Report No. 2 for Australian Application No. 2013254937, dated Feb. 18, 2016.
Partridge, Kurt et al., "Facile: a framework for attention-correlated local communication" In Mobile Computing Systems and Applications, 2003. Proceedings, Fifth IEEE Workshop, Publication Date Oct. 9-10, 2003, pp. 139-147 Posted online: Oct. 27, 2003 09:54:30.0. [retrieved on Nov. 29, 2007]. Retrieved from the Internet: <URL: http://www.lit.edu/~newmsar/facile.pdf>, 9 pages.
Citation showing publication date for Partridge, Kurt et al., "Facile: a framework for attention-correlated local communication" In Mobile Computing Systems and Applications, 2003, Proceedings, Fifth IEEE Workshop, Publication Date Oct. 9-10, 2003, pp. 139-147 Posted online: Oct. 27, 2003 09:54:30.0 [retrieved on Nov. 29, 2007] Retrieved from the Internet <URL: http://ieeexplore.ieee.org/xpl/absprintf.jsp?arnumber=1240775&page=FREE>, 1 page.
Rowe, Lawrence A., "Webcast and Distributed Collaboration Control Automation," Research Proposal Submitted to NSF (Feb. 1, 2001), Webcast/Collaboration Control Automation Proposal, 16 pages.
Dimitrova, Nevenka et al., "Applications of Video-Content Analysis and Retrieval," IEEE MultiMedia, 1070-086X/02, Jul.-Sep. 2002, pp. 42-55.
Rowe, Lawrence A., "Distributed Streaming Media Application Middleware," Research Proposal Submitted to NSF Middleware Program (Mar. 2002), 18 pages.
Dr. Bill Hancock, "Security Views" Computers & Security, Elsevier Science Publishers, vol. 18, No. 6, ISSN: 0167-4048, 1999, pp. 458-470.
Xin Feng et al., "Integrating Embedded PC and Internet technologies for Real-Time Control and Imaging" IEEE/ASME Transactions on Mechatronics, vol. 7, No. 1, ISSN: 1083-4435, Mar. 2002, pp. 52-60.
Ming Li et al., "Embedded Video Surveillance System for Vehicle over WLAN and CDMA1X" IEEE vol. 2, ISBN: 978-0-7803-9335-6, 2005, pp. 1292-1295.
Frank Stajano et al., "The Resurrecting Duckling: Security Issues for Ad-hoc Wireless Networks" Security Protocols Lecture Notes in Computer Science, ISBN: 978-3-540-67381-1, 2000, pp. 172-182.
Texas Instruments, "TMS320DM320 CPU and Peripherals vol. 1," 2003, [Online] Retrieved from the Internet <URL: http://www.heyrick.co.uk/blog/files/datasheets/tms320dm320part1.pdf>, 2003, 8 pgs.
Office Action for U.S. Appl. No. 11/472,997, dated Nov. 18, 2008.
Final Office Action for U.S. Appl. No. 11/472,997, dated Aug. 13, 2009.
Office Action for U.S. Appl. No. 12/781,434, dated Mar. 3, 2011.
Office Action for U.S. Appl. No. 13/305,180, dated Jan. 24, 2012.
Final Office Action for U.S. Appl. No. 13/305,180, dated Aug. 2, 2012.
Office Action for U.S. Appl. No. 11/457,855, dated Jul. 21, 2009.
Office Action for U.S. Appl. No. 11/457,855, dated Jan. 6, 2010.
Final Office Action for U.S. Appl. No. 11/457,855, dated Jun. 21, 2010.
Office Action for U.S. Appl. No. 11/457,855, dated Oct. 14, 2010.
Office Action for U.S. Appl. No. 11/457,887, dated Feb. 10, 2009.
Office Action for U.S. Appl. No. 11/457,887, dated Nov. 10, 2009.
Office Action for U.S. Appl. No. 11/457,887, dated Mar. 26, 2010.
Office Action for U.S. Appl. No. 11/457,887, dated Nov. 9, 2010.
Final Office Action for U.S. Appl. No. 11/457,887, dated Aug. 16, 2011.
Examination Report for Canadian Application No. 2,656,826, dated Jan. 17, 2014.
Examination Report for Canadian Application No. 2,656,826, dated Aug. 20, 2014.
Office Action for Chinese Application No. 200780030452.2, dated Feb. 18, 2011.
Office Action for Chinese Application No. 200780030452.2, dated Mar. 29, 2012.
Office Action for Chinese Application No. 200780030452.2, dated Nov. 5, 2012.
Office Action for Chinese Application No. 201310271947.1, dated May 29, 2015.
Extended Search Report for European Application No. 07812250.4, dated Sep. 20, 2012.
Examination Report for European Application No. 07812250.4, dated May 27, 2013.
Summons to attend oral proceedings for European Application No. 07812250.4, dated Mar. 13, 2014.
Office Action for Japanese Application No. 2009-516745, dated Jul. 4, 2012.
Office Action for Japanese Application No. 2009-516745, dated Feb. 1, 2013.
Decision of Rejection for Japanese Application No. 2009-516745, dated Aug. 16, 2013.
Office Action for Mexican Application No. Mx/a/2012/005964 dated Aug. 1, 2012.
English-language summary for Office Action for Mexican Application No. Mx/a/2012/005964 dated Aug. 1, 2012.
Office Action for Mexican Application No. Mx/a/2012/005964 dated Jan. 29, 2013.
Office Action for Taiwan Application No. 096122607, dated Jan. 14, 2013.
Office Action for Taiwan Application No. 096122607, dated Mar. 3, 2014.
Office Action for Taiwan Application No. 096122607, dated Jul. 16, 2014.
International Search Report and Written Opinion for International Application No. PCT/US07/71872, dated Sep. 15, 2008.
International Search Report, and Written Opinion for International Application No. PCT/US07/73608, dated Feb. 25, 2008.

* cited by examiner

EMBEDDED APPLIANCE FOR MULTIMEDIA CAPTURE

CROSS-REFERENCE TO RELATED PATENT APPLICATION

This application is a continuation of U.S. patent application Ser. No. 13/912,944, entitled "Embedded Appliance For Multimedia Capture," filed Jun. 7, 2013 (now U.S. Pat. No. 9,071,746), which is a continuation of U.S. patent application Ser. No. 13/305,180, entitled "Embedded Appliance For Multimedia Capture," filed Nov. 28, 2011 (now U.S. Pat. No. 8,503,716), which is a continuation of U.S. patent application Ser. No. 12/781,434, entitled "Embedded Appliance For Multimedia Capture," filed May 17, 2010 (now U.S. Pat. No. 8,068,637), which is a continuation of U.S. patent application Ser. No. 11/472,997 entitled "Embedded Appliance For Multimedia Capture," filed Jun. 23, 2006 (now U.S. Pat. No. 7,720,251), all of which are incorporated herein by reference in their entirety.

FIELD OF INVENTION

The invention relates generally to an apparatus and method for media signal capture, and more particularly to an apparatus and method for capturing media signals using an embedded appliance.

BACKGROUND

The ability to capture live media recordings of, for example, classroom instruction and meetings for on-demand availability and time-shifted viewing has become valuable to institutions such as universities and businesses. Although some commercial solutions for capturing and publishing live recordings are known, these solutions are often implemented on general purpose devices such as a personal computer (PC). Because these PC-based capture solutions use general purpose components and software, they are expensive, difficult to maintain, inefficient when capturing and storing signals, vulnerable to security threats, require special technical support and can be difficult to integrate into, for example, a smart classroom environment. Thus, a need exists for a purpose-built multimedia capture device.

SUMMARY

A multimedia device includes input ports dedicated to receiving a real-time media signal and a processor system dedicated to capturing the real-time media signal. The processor system defines an embedded environment. The input ports and the processor system are integrated into the multimedia capture device. The input ports include an audio input port and at least one of a visual-capture input port or a digital-image input port.

DETAILED DESCRIPTION

An embedded appliance for multimedia capture (also referred to herein as an "embedded appliance") is a device dedicated to capturing, processing, storing and/or sending real-time media signals (e.g. audio signal, video signal, visual-capture signal, digital-image signal). The embedded appliance can capture real-time media signal(s) that can include digital-image signals, visual-capture signals, audio signals and/or video signals of, for example, an in-progress classroom presentation. After the media signal(s) have been captured, the embedded appliance can process the signal(s) by, for example, compressing, indexing, encoding, decoding, synchronizing and/or formatting the content. Embedded appliances can be, for example, distributed throughout a network and coordinated according to a schedule to capture, process, store and send the real-time media signals for eventual retrieval by a user from, for example, a control server and/or a server(s) configured as, for example, a course management system. Media streams being captured on the embedded appliance optionally can also be monitored and/or further processed by a control server before distribution.

As a dedicated (i.e., specific-purpose) device having an embedded environment, the embedded appliance uses a hardened operating system (OS) and a processor (e.g., processor system) to capture, process, store and/or send real-time media signals. The hardened OS is configured to resist security attacks (e.g., prevent access by an unauthorized user or program) and facilitate functions related only to the capturing, processing, storing and/or sending of real-time media signals. In other words, the hardware and software within the embedded appliance are integrated into and designed specifically for capturing, processing, storing and/or sending real-time media signals. Because the hardware and software for capturing, processing, storing and/or sending real-time media signals are integrated into the embedded environment of the embedded appliance, the costs and complexity associated with installation, scaling, design, deployment and technical support can be lower than that for a general purpose system.

A real-time media signal represents an image and/or a sound of an event that is being acquired by a sensor at substantially the same time as the event is occurring and that is transmitted without a perceivable delay between the sensor when acquired and an embedded appliance. The capturing, processing, storing and/or sending of the real-time media signals by the embedded appliance can be performed at any time. Throughout the specification, real-time media signals are also referred to as media signals.

Figure 1:
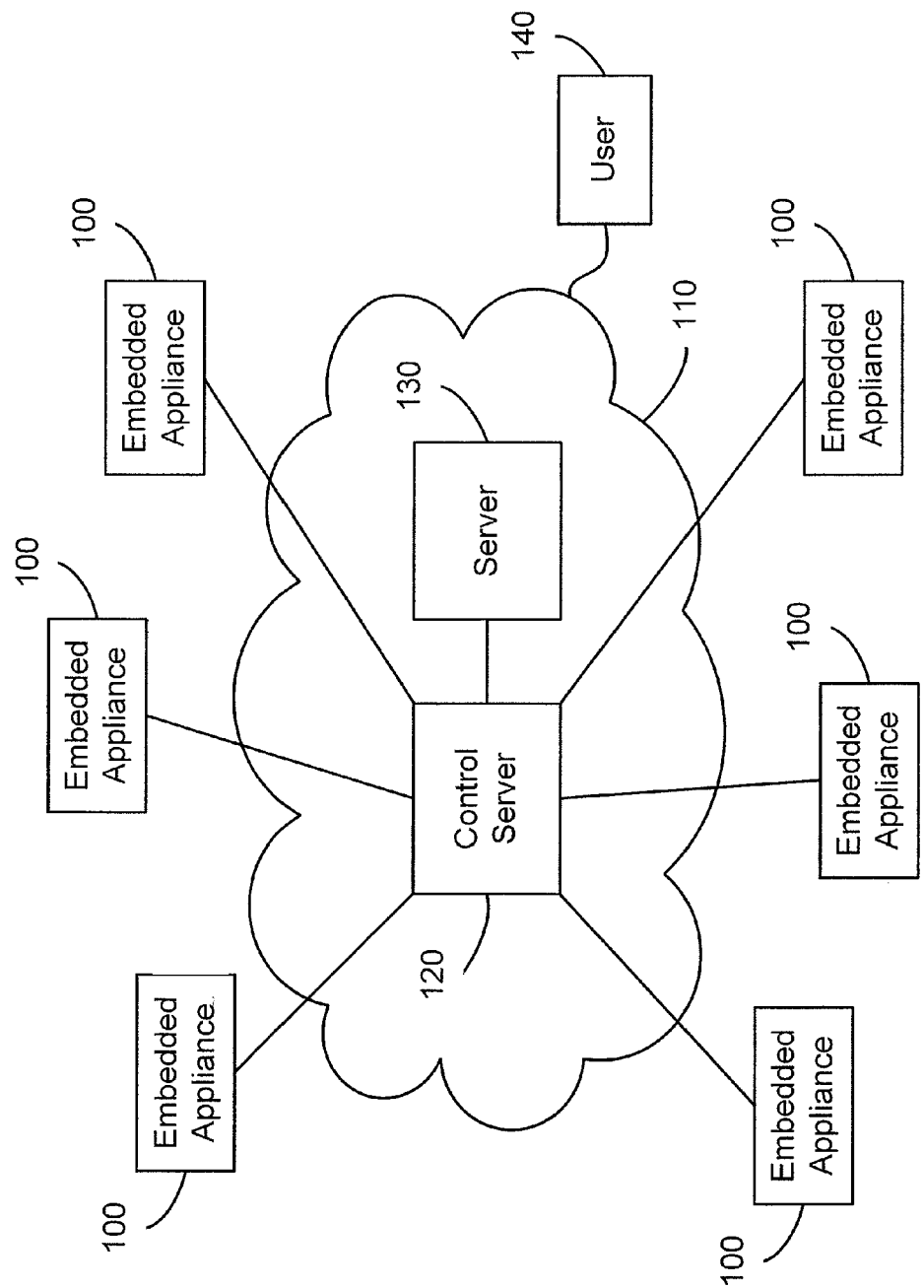
FIG. 1 is a system block diagram that illustrates embedded appliances coupled to a control server over a network, according to an embodiment of the invention.

FIG. 1 is a block diagram that illustrates embedded appliances 100 distributed across a network 110 and connected to a control server 120. The control server 120, in this embodiment, is connected with a server 130 that is configured, for example, as a course management system (e.g., a server running Blackboard™ or WebCT). The network 110 can be any type of network including a local area network (LAN) or wide area network (WAN) implemented as a wired or wireless network in a variety of environments such as, for example, an office complex or a university campus. The embedded appliances 100 can capture real-time media signals including audio signals, visual-capture signals, digital-image signals and video signals acquired through electronic capture devices or sensors such as microphones, web cameras, video cameras, still cameras and video players. The embedded appliances 100 can also be configured to process, store and/or send captured real-time media signals. Data associated with the content captured by real-time media signals can also be processed, stored, and/or sent; such data can include, for example, capture time, capture location, and/or speaker's name.

The embedded appliances 100 can be prompted to start and stop capturing real-time media signals in response to start and stop indicators generated by, for example, the control server 120 or the embedded appliances 100. The start and stop indicators can be generated according to a schedule determined and/or stored by the control server 120 and/or each embedded appliance 100. If implemented in, for example, a university campus environment, embedded appliances 100 can be fixed in university classrooms and connected via a university communications network. An embedded appliance 100 can be prompted, for example, according to a schedule stored on the embedded appliance 100 to capture media signals from a particular university classroom at a specific time.

Media signals captured by each embedded appliance 100 are processed, stored and sent to a control server 120. The control server 120 receives the media signals and sends them to the server 130 where the content of the media signals are made available for distribution. In some embodiments, the content of the media signals can be made available for distribution to a user 140 at the control server 120. In some embodiments, further processing of the media signals can be performed on the control server 120 and/or another processing device (not shown) before the content of the media signals is made available for distribution. The embedded appliances 100 and/or control server 120 can process the media signals by, for example, compressing, indexing, encoding, decoding, synchronizing and/or formatting the media signals.

The embedded appliances 100 can be prompted to start and stop sending processed real-time media signals in response to start and/or stop indicators generated by, for example, the control server 120 or the embedded appliance 100. The start and/or stop indicators can be generated according to a schedule or according to defined conditions. In some embodiments, the start and/or stop indicator can be a trigger signal generated by a trigger generator within a control server and received by a trigger receiver within an embedded appliance. More details regarding trigger signals in the context of video signal capturing are set forth in co-pending application Ser. No. 10/076,872, publication no. U.S. 2002/0175991 A1, "GPI Trigger Over TCP/IP for Video Acquisition," which is incorporated herein by reference.

The embedded appliances 100 can also be configured to send media signals after any stage of processing. For example, an embedded appliance 100 can be configured to send media signals to a control server 120, based on network traffic conditions, unsynchronized and unformatted portions of audio and digital-images signals after the signals have been compressed. The control server 120 can be configured to synchronize and format the audio and digital-image signals received from the embedded appliance 100.

The capturing of media signals on the embedded appliance 100 can also be monitored by the control server 120 through, for example, a confidence monitoring signal. The confidence monitoring signal can be used by the control server 120 to determine whether a particular embedded appliance 100 is properly capturing media signals according to, for example, a schedule. The confidence monitoring signal can include any combination of media signals or portions (e.g., split signal) of any of the media signals that are captured and/or detected by an embedded appliance 100. For example, the confidence monitoring signal can be a frame/image acquired periodically from a video signal. The confidence monitoring signal can be a compressed or uncompressed media signal. The confidence monitoring signal can also be a separate signal/indicator generated based on the media signal indicating that a media signal is being captured. For example, the confidence monitoring signal can be a binary indicator that indicates that a particular media signal is either being captured or not captured by an embedded appliance 100.

Although FIG. 1 only shows a single control server 120 connected with multiple embedded appliances 100 in some embodiments, in other embodiments, more than one control server 120 can be connected with any combination of embedded appliances 100. For example, two control servers 120 can be configured to coordinate the capturing, processing, storing and/or sending of media signals captured by embedded appliances 100. The embedded appliances 100 can be programmed to recognize multiple control servers 120 and can be programmed to, for example, send a portion of a processed media signal to one of the control servers 120.

Figure 2:
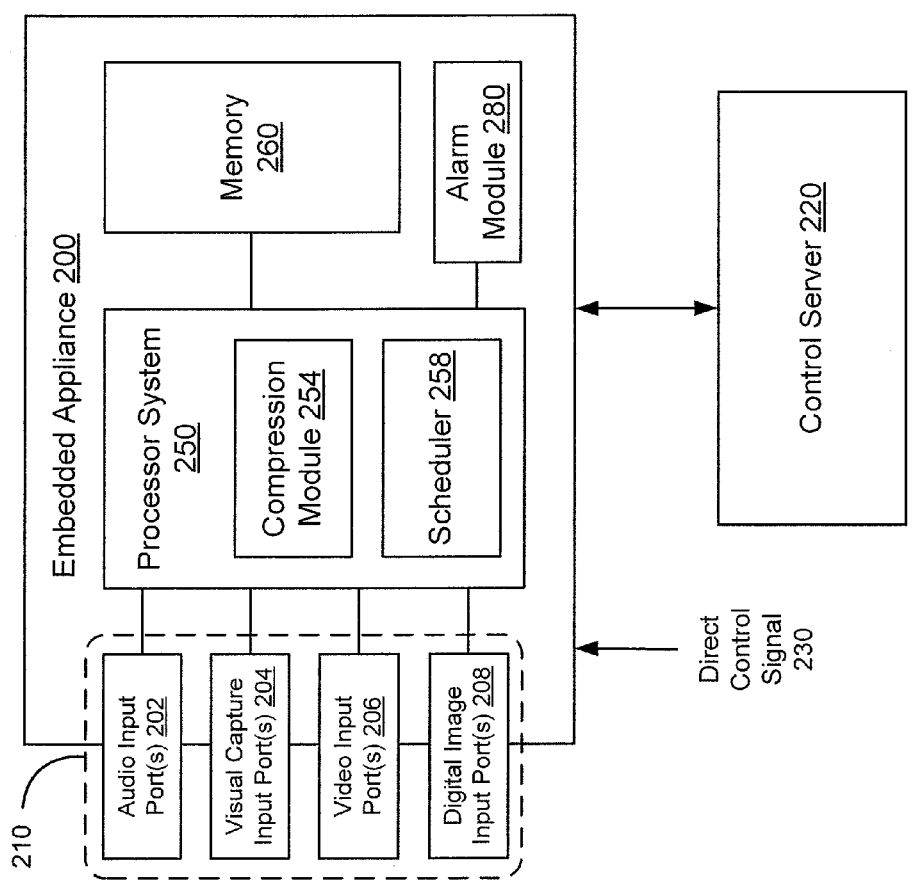
FIG. 2 is a system block diagram that illustrates an embedded appliance having input ports, a processor system, a memory and an alarm module, according to an embodiment of the invention.

FIG. 2 is a system block diagram that illustrates an embedded appliance 200 with input ports 210, a processor system 250, a memory 260 and an alarm module 280. The embedded appliance 200 captures real-time media signals from various electronic devices via the input ports 210 in response to start and stop indicators generated by a scheduler 258 in the processor system 250. The processor system 250 receives and compresses the media signals using a compression module 254. The processor system 250 can use the memory 260 to perform any function related to the embedded appliance 200 such as storing compressed media signals. The embedded appliance 200 captures and transmits compressed media signals to the control server 220 when prompted by the scheduler 258. The captured media signals can be sent to the control server 220 as, for example, a multiplexed signal over a network connection via an output port (not shown) of embedded appliance 200.

The input ports 210 include an audio input port(s) 202, a visual-capture input port(s) 204, a video input port(s) 206 and a digital-image input port(s) 208. Each of the input ports 210 are integrated as part of the embedded environment of the embedded appliance 200. The media signals captured by the inputs ports 210 can be received as an analog signal or as a digital signal. If received as an analog signal, the processor system 250 can convert the analog signal into a digital signal and vice versa.

The audio input port(s) 202 is used to capture an audio signal. The audio input port(s) 202 can be, for example, an RCA stereo audio input port(s), a ¼" jack stereo audio input port(s), XLR input port(s) and/or a universal serial bus (USB) port(s). The audio signal can be produced by any type of device capable of producing an audio signal, for example, a stand alone microphone or microphone connected to a video camera.

The visual-capture input port(s) 204 receives a digital or analog video-graphics-array (VGA) signal through, for example, a VGA input port(s), digital visual interface (DVI) input port(s), extended graphics array (XGA) input port(s), HD-15 input port(s) and/or BNC connector port(s). The visual-capture input port 204 captures images produced by, for example, a computer or a microscope. An electronic device connected to the visual-capture input port 204 can also be used to capture images from, for example, an electronic whiteboard transmitting images via, for example, a VGA signal.

The video input port(s) 206 receives motion video signals from devices such as video cameras via an input port(s) that includes, but is not limited to, an s-video input port(s), composite video input port(s) and/or component video input port(s).

The digital-image input port(s) 208 captures digital-images via an input port(s) such as an Ethernet port(s) and/or a USB port(s). The digital-images can be acquired using, for example, a digital camera or a web camera.

The hardware components in the processor system 250, which can include, for example, application specific integrated circuits (ASICs), central processing units (CPUs), modules, digital signal processors (DSPs), processors and/or co-processors, are configured to perform functions specifically related to capturing, processing, storing and/or sending media signals.

The embedded appliance 200 captures any combination of real-time media signals received through the input ports 210 using the processor system 250. Each of the media signals, although collected via different input ports 210, are synchronously acquired by the embedded appliance 200. For example, even though the sound of chalk against a classroom board can be received via a microphone through the audio input port 202, the motion of a professors hand wielding the chalk can be received synchronously using a video camera connected to the video input port 206. These media signals are synchronously received and processed by the embedded appliance 200.

In some embodiments, the embedded appliance 200 can be configured to capture only certain portions of media signals. The embedded appliance 200 can be configured to, for example, capture and store sounds received via a microphone while ignoring static and/or silence. The embedded appliance 200 can also be configured to, for example, capture a video signal or a digital-image signal only when movement or a substantial change in a scene is detected. In many embodiments, each of the input ports 210 included in the embedded appliance 200 can be configured to capture one or more media signals at different and/or variable rates. For example, the video input port 206 can be configured to receive video signals at a high frame rate compared with a frame rate of digital images received by the digital-image input port 208.

The processor system 250, using the compression module 254, can compress the media signals as they are received. The compression module 254 can compress, for example, an audio signal and a synchronously received digital VGA signal into a number of compression formats such as, for example, a motion pictures experts group (MPEG) layer 2 format. The compression module 254 can also compress media signals into more than one format simultaneously. For example, if receiving a digital-image signal and an associated audio signal, the digital-image signal can be compressed into a joint photographic experts group (JPEG) format while the audio signal can be compressed into an MPEG audio layer 3 (MP3) format. In some embodiments, the compression module 254 can compress a single media signal into multiple formats simultaneously. Similarly, one or more media signals can be compressed into a single compressed stream (e.g., MPEG-4).

The compression module 254 can be configured to adjust a multiplicity of variables including the frame rates, bit rates, frequency, resolution, color and stabilization of the input signals using any combination of lossy or lossless formats using one or more codecs. A codec is a device, hardware module and/or software module configured to encode and/or decode, for example, a captured media signal. The compression module 254 can also be configured to simultaneously compress, decompress, encode and/or decode any combination of media signals into any combination of formats. The formats do not have to be compatible with one another.

In some embodiments, the processor system 250 and the compression module 254 can be configured to use, for example, different codecs depending on the type of input device that is connected to an input port 210. For example, if a web camera is used to capture digital-images via the digital-image input port 208, the images can be compressed into a tiff format, but if a digital still camera is used to capture a digital-image signal, the processor system 250 and compression module 254 can be programmed or otherwise configured to detect the difference and use a JPEG compression codec instead.

After the processor system 254 compresses media signals, the compressed media signals are stored in the memory 260 for later sending to, for example, the control server 220 for further processing. The memory 260 can be any appropriate type of fixed and/or removable storage device. The memory can be, but is not limited to, a tape, digital-video-disk (DVD), digital-video-cassette (DVC), random-access-memory (RAM), flash memory and/or hard disk drive. The size of the memory 260 can vary depending on the amount of storage needed for a particular application. For example, the size of the memory 260 can be increased if an embedded appliance 200 is intended to capture large quantities of media signals compressed in a lossless format. The size of the memory 260 can also be increased if an embedded appliance 200 is intended to, for example, capture media signals over relatively long periods of time (e.g., during network down time) without uploading captured media signals to, for example, the control server 220. The memory 260 can be used to prevent the loss of captured media signals that cannot be sent to, for example, a control server because of a network outage. In some embodiments, the processor system 250 can, if necessary, use the memory 260 to buffer information received via the input ports 210 before compression.

The processor system 250 also includes a scheduler 258 that can generate start and stop indicators to prompt the embedded appliance 200 to, for example, start and stop capturing and/or start and stop sending media signals. The scheduler 258 can access a schedule that is either stored locally on the embedded appliance 200 or on the control server 220. The schedule can include, for example, start and stop times that are specific to input ports 210. For example, if a professor will teach a one-hour class on one day of the week, every week for four months, the scheduler 258 can use a schedule to prompt the embedded appliance 200 to capture the professor's lecture for one hour on the day of the lecture every week for the four-month time period. The scheduler 258 can be configured to capture or send media signals according to more than one schedule stored on, for example, the embedded appliance 200.

The scheduler 258 can generate a schedule or receive a schedule from the control server 220. For example, the scheduler 258 can generate a schedule for sending captured media signals based on input from the control server 220 indicating preferred transmission times. In some embodiments, the scheduler 258 can access and execute a schedule that is, for example, sent from the control server 220 and stored in the memory 260 of the embedded appliance 200. In some embodiments, the scheduler 258 can be used to start and stop not only the capturing and/or sending of media signals by the embedded appliance 200, but also the processing and/or storing of media signals.

Rather than using a schedule to prompt the capturing and/or sending of media signals, the scheduler 258 can prompt certain functions to be performed based on defined criteria. For example, the scheduler 258 can be configured to prompt the sending of media signals from the embedded appliance 200 when a certain amount of bandwidth is available for use by the embedded appliance 200. In some embodiments, the scheduler 258 is included as a hardware and/or software module that is separate from the processor system 250.

In some embodiments, rather than a processor system 250 having multiple processors, the embedded appliance includes a single processor that can be any type of processor (e.g., embedded processor or a general purpose processor) configured to define and/or operate within an embedded environment. The single processor can be configured to execute the functions performed by the processor system 250 and/or other functions within the embedded appliance 200. In some embodiments, the processor system 250, in addition to the compression module 254, can include other processors and/or co-processors that are configured to operate in the embedded environment of the embedded appliance 200.

In some alternative embodiments, the functions of the scheduler in the embedded appliance can be performed by the control server. In such embodiments, if all of the functions of the scheduler are performed by the control server, the embedded appliance can be designed without the scheduler. For example, the control server can store schedules associated with each embedded appliance distributed throughout a network and can send start and stop indicators to each embedded appliance to capture and/or send media signals.

In some embodiments, the start and stop indicators from the control server 220 can be based on variables such as the storage and/or sending capacity of each embedded appliance 200. The control server 220 can query each embedded appliance 200 to determine, for example, how much memory 260 capacity each embedded appliance 200 has available. The control server 220 can also, for example, receive a signal from each embedded appliance 200 indicating how much memory 260 capacity each embedded appliance 200 has available. The control server 220 can then prioritize and prompt the sending of information from the embedded appliances 200 based on memory capacity indicators.

As FIG. 2 shows, the embedded appliance 200 can include an alarm module 280 that is a hardware and/or software module. The alarm module 280 can include both an output port (not shown) for sending a signal and an input port for receiving a signal. The alarm module 280 can be used to send a signal to the control server 220 in the event of a physical security breach. For example, if the position of the embedded appliance 200 is changed from its fixed position in, for example, a conference room in a building, the alarm module 280 can send a signal indicating that a physical breach has occurred. The alarm module 280 can send, for example, an identifier associated with the embedded appliance 200 so that the breached embedded appliance 200 can be identified by, for example, the control server 220. In addition to alternatively, the control server 220 can send, for example, a ping signal to the alarm module 280 to determine whether the embedded appliance 200 is functioning properly and/or has been physically breached (e.g., removed).

FIG. 2 also illustrates that the embedded appliance 200 can be controlled using a direct control signal 230 from, for example, a user. The embedded appliance 200 can include an interface such as a graphical user interface (GUI) (not shown), physical display (not shown) or buttons (not shown) to produce the direct control signal 230 to control some or all of the functions that can be performed by the embedded appliance 200. The direct control signal 230 can be used to, for example, modify a schedule stored on the embedded appliance 200, modify the processing of media signals, troubleshoot an error on the embedded appliance 200 or control the embedded appliance, for example, while the control server 220 is down. The direct control signal 230 can also be used to, for example, start and stop capturing and/or sending of media signals. The embedded appliance 200 can be configured to require authentication (e.g., username/password) of, for example, a user before accepting a direct control signal 230 sent via an interface (not shown) from the user. The direct control signal 230 can also be generated using, for example, an interface (not shown) that is not directly coupled to the embedded appliance 200. In some embodiments, the embedded appliance can be directly controlled using the control server 220.

In some embodiments, the processor system 250 can include other software and/or hardware modules to perform other processing functions such as, for example, encoding, decoding, indexing, formatting and/or synchronization of media signals. In some embodiments, the embedded appliance 200 can be configured without a compression module 245 and can send uncompressed media signals to the control server 220.

Figure 3:
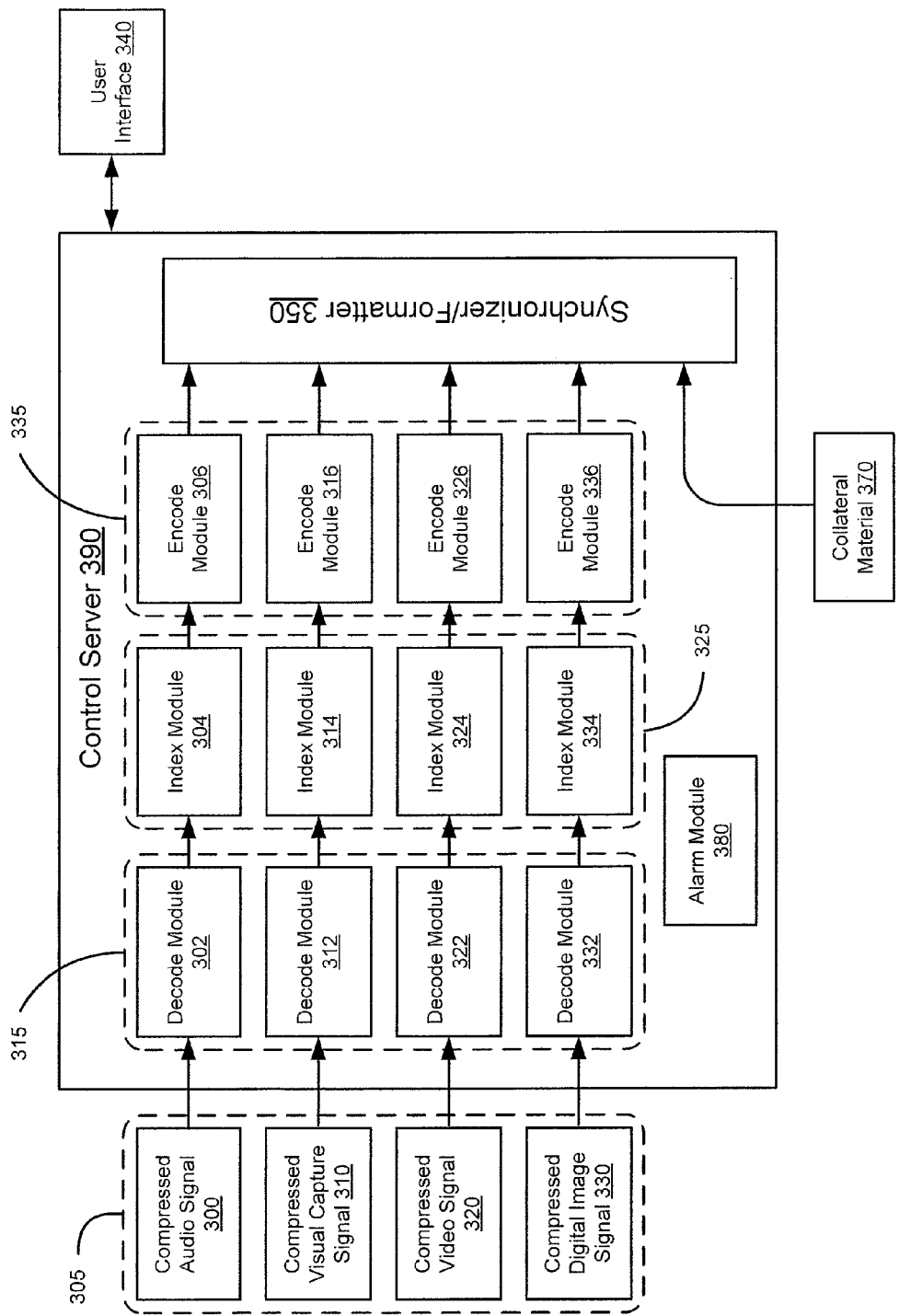
FIG. 3 is a block diagram that shows the flow of media signals through modules in a control server, according to an embodiment of the invention.

FIG. 3 is a block diagram that shows the flow of media signals from an embedded appliance through modules in a control server 390. The control server 390 receives separate compressed real-time media signals 305 including a compressed audio signal 300, compressed visual-capture signal 310, compressed video signal 320 and compressed digital-image signal 330. Although this figure shows that each of the media signals 305 are received separately, the media signals 305 can be received by the control server 390 over, for example, an internet protocol (IP) network connection as a multiplexed signal that can be de-multiplexed by the control server 390 when received. In some embodiments, the media signals 305 can be combined into one or more signals encoded into one or more formats by the embedded appliance that can be decoded and separated by the control server 390 when received. For example, audio and video signals can be combined into a single MPEG-2 signal before being sent by an embedded appliance to the control server 390. Also, the control server 390 can receive media signals 305 from more than one embedded appliance and can process each of the media signals 305 in parallel using, for example, multi-threaded processing.

Each of the compressed media signals 305 that are received by the control server 390 are similarly processed. Each of the signals 305 can be processed by one of the decode modules 315, index modules 325 and encode modules 335. After each of the media signals 305 has been processed (e.g., individually processed, processed as a group), the signals are synchronized and/or formatted by the synchronizer/formatter 350.

The processing of the compressed video signal 320 will be used as a representative example of the processing of the compressed media signals 305. The processing of the remaining signals 305 can be understood in light of this representative example.

When the compressed video signal 320 is received by the control server 390, the signal is decompressed from its compressed format by the decode module 322 into a decoded video signal. The decode module 322 can be configured to detect the format of the compressed video signal 320 when it is received to properly decode/decompress the signal 320. The compressed video signal 320, when converted into a decoded video signal, can be decoded to its original format or into any other format that can be used by the control server 390 to continue processing the signal. In some embodiments, the compressed video signal 320 can be received in a format that can be processed by the control server 390 without decoding. In this scenario, the compressed video signal 320 can be shunted around the decode module 322.

The decoded video signal is then processed by the index module 324 to index the decoded video signal by, for example, determining and marking scene changes. The indexing is performed so that the decoded video signal can later be properly synchronized with the other media signals 305 by the synchronizer/formatter 350 and to provide relevant index points for use by, for example, an end-user (not shown). Segments, rather than scenes, are detected from the compressed audio signal 300 using the index module 304 so that the compressed audio signal 300 can be properly synchronized with the other media signals 305 and to provide relevant index points for use by, for example, an end-user (not shown). The decoded video signal with indexing (e.g., scene change markings) is then encoded by the encode module 326 into an encoding that can be synchronized and formatted by the synchronizer/formatter 350.

Returning to the general discussion of FIG. 3, the synchronizer/formatter 350 receives the media signals 305 after processing through the decode 315, index 325 and encode 335 modules. The synchronizer/formatter 350 indexes, synchronizes and formats the media signals so that they can be accessed by a user via a user interface 340. In the synchronization process, the scenes from each of the media signals and the audio segments are synchronized so that, for example, the sound of a dropped pen hitting a floor is matched with video of the pen hitting the floor. The synchronized media signal can be formatted by the synchronizer/formatter 350 into any format that can be used by a user.

The synchronizer/formatter 350 can receive collateral material 370 and can combine collateral material 370 with the media signals 305 that have been processed by the modules. The collateral material 370 can be, for example, additional marking information that can be combined with the processed media signals to aid in the synchronizing process. In some embodiments, the collateral material can be additional media signals captured by other multimedia capture devices (not shown) that are to be combined with the media signals 305 already shown. Although not shown in FIG. 3, the control server 390 can include separate modules that decode, index (e.g., scene/segment detect or optical character recognition) and/or encode the collateral material 370 received by the control server 390.

Although FIG. 3 shows that separate modules perform decoding, indexing, encoding, synchronizing and formatting, the functions of each of the modules can be further subdivided and/or combined into one or more processors or modules. These functions can also be subdivided and/or combined onto more than one control servers. Also, the control server 390 can include a memory (not shown) or a separate database (not shown) for storing information and/or buffering information that is received from one or more embedded appliances.

Any combination of the functions performed by any of the modules and/or other component of the control server 390 can alternatively be performed on an embedded appliance. For example, the indexing can be performed by an embedded appliance before the media signals are compressed and transmitted to the control server 390.

The control server 390 can also receive an input signal from a user via the user interface 340. The user interface 340 can be, for example, a remote computer that is interfacing with the control server 390 via a network connection and/or can be an interface that is integrated into the control server 390. The user interface 340 can be used to control any of the modules and their associated functions and/or to specify parameters for processing information on the control server 390. A user input signal can specify, for example, the type of format that should be used by the synchronizer/formatter 350 for a particular set of media signals 305 received at the control server 390. A user interface 340 can be configured so that a user can manually manipulate any of the media signals 305 received by embedded appliances distributed across a network.

The user interface 340 can also be used to access, monitor and/or control any embedded appliances (not shown) that can be connected to the control server 390 and distributed, for example, over a network. Access to embedded appliances and/or the control server 390 via the user interface 340 can be, for example, password protected. The user interface 340 can be used to define, for example, schedules used by the embedded appliance or schedules used by the control server to send signals to start and stop capturing, processing, storing and/or sending by distributed embedded appliances. The user interface 340 can also be used to view confidence monitoring signals that can be generated by embedded appliances connected to the control server 390.

The user interface 340 can also be used to access the final synchronized/formatted content generated by the control server 390. More than one user interface 340 can be distributed across a network and can be configured to access the content produced by the control server 390 (e.g., personal computers distributed over a university network accessing the control server 390). In some embodiments, the control server 390 sends the content to a server (not shown) where the content is made available to one or more users through a user interface 340.

As FIG. 3 shows, the control server 390 includes an alarm module 380 for detecting a security breach with any embedded appliance that can be associated with the control server 390. The alarm module 380 can be used to send a signal to, for example, a user via the user interface 340 in the event of a physical breach of an embedded appliance (not shown). In some embodiments, the alarm module 380 can be programmed to send an indicator via, for example, e-mail to user indicating that a particular embedded appliance has been breached in a particular way.

Figure 4:
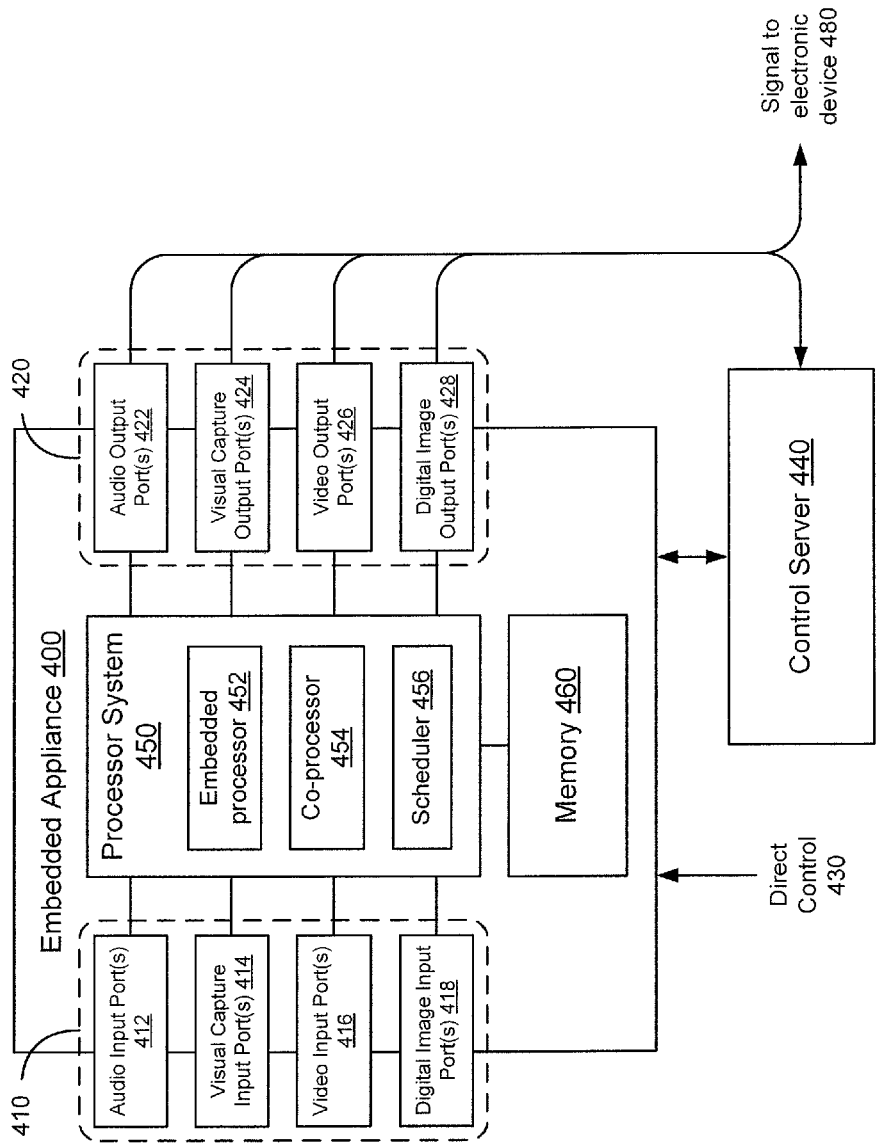
FIG. 4 is a system block diagram of an example embodiment of an embedded appliance having input ports, output ports, a processor system and a memory, according to an embodiment of the invention.

FIG. 4 is a system block diagram of an example embodiment of an embedded appliance 400 with input ports 410, output ports 420, a processor system 450 and a memory 460.

The embedded appliance 400 captures real-time media signals from electronic devices (e.g., microphone, camera) via the input ports 410 in response to start and stop indicators generated by a scheduler 456. The processor system 450 accesses the memory 460 to perform functions related to the embedded appliance 400 such as storing processed media signals. The embedded appliance 400 transmits processed media signals via the output ports 420 to the control server 440.

The input ports 410 include an audio input port(s) 412, a visual-capture input port(s) 414, a video input port(s) 416 and a digital-image input port(s) 418. Each of the output ports 410 is configured to output a media signal that corresponds with an input port 420. The output ports 420 include an audio output port(s) 422, a visual-capture output port(s) 424, a video output port(s) 426 and a digital-image output port(s) 428. The output ports 420 can be used to transmit processed media signals to the control server 440 that are stored in, for example, the memory 460. The output ports 420 can also be used to output a signal such as a confidence monitoring signal to, for example, the control server 440 or to other electronic devices 480.

The processor system 450 includes an embedded processor 452, a co-processor 454 and a scheduler 456. The embedded processor 452 and/or co-processor 454 can be, for example, a digital signal processor (DSP) dedicated to processing media signals by capturing, compressing, encoding, decoding, indexing, synchronizing and/or formatting the media signals. The co-processor 454 can be, for example, a processor such as a field programmable gate array (FPGA) that is programmed to control the functions performed by the embedded processor 452. The co-processor 454 and/or embedded processor 452 can, for example, include the scheduler 456 as a module. In some embodiments, the scheduler 456 is included as a module that is separate from the processor system 450.

In some embodiments, rather than a processor system 450 having multiple processors, the embedded appliance includes a single processor that can be any type of processor (e.g., embedded processor or a general purpose processor) configured to define and/or operate within an embedded environment. The single processor can be configured to execute the functions performed by the processor system 450 and/or other functions within the embedded appliance 400. In some embodiments, the processor system 450, in addition to the embedded processor 452 and co-processor 456, can include other processors and/or co-processors that are configured to operate in the embedded environment of the embedded appliance 400.

The processor system 450 and/or other processors (not shown) that are not included in the processor system 450 can be configured to perform additional functions for the embedded appliance 400. For example, the processor system 450 can be configured to support splitting of captured media signals. In such a case, the processor system 450 can be configured to include hardware and/or software modules such as, for example, a visual-capture distribution-amplifier (e.g., an on-board VGA distribution amplifier), a visual-capture signal splitter, and/or a visual-capture sync stabilizer. Some combinations of these hardware and/or software modules can enable the embedded appliance 400 to capture, for example, a VGA signal via the visual-capture input port 414 and return a copy of the signal (also referred to as a split signal) to an electronic device 480 (e.g., classroom projector) via the visual-capture output port 424. Using these hardware and/or software modules, the processor system 450 can also be configured to synchronize and stabilize a split media signal before the signal is transmitted to an electronic device 480.

In some embodiments, the processor system 450 can be programmed to support, for example, an Ethernet switch (not shown) (e.g., a multi-port fast Ethernet switch, Gigabit Ethernet switch) and/or a power-over-Ethernet (PoE) port (not shown). Some embodiments of the embedded appliance 400 can include integrated relays (not shown) to shunt the signal (e.g., visual-capture input signal) through the embedded appliance 400 in case of a power failure. The integrated relays can pass media signals through the embedded appliance and out of the output ports 420 to, for example, a classroom projector if power to the embedded appliance 400 is disrupted.

Figure 5:
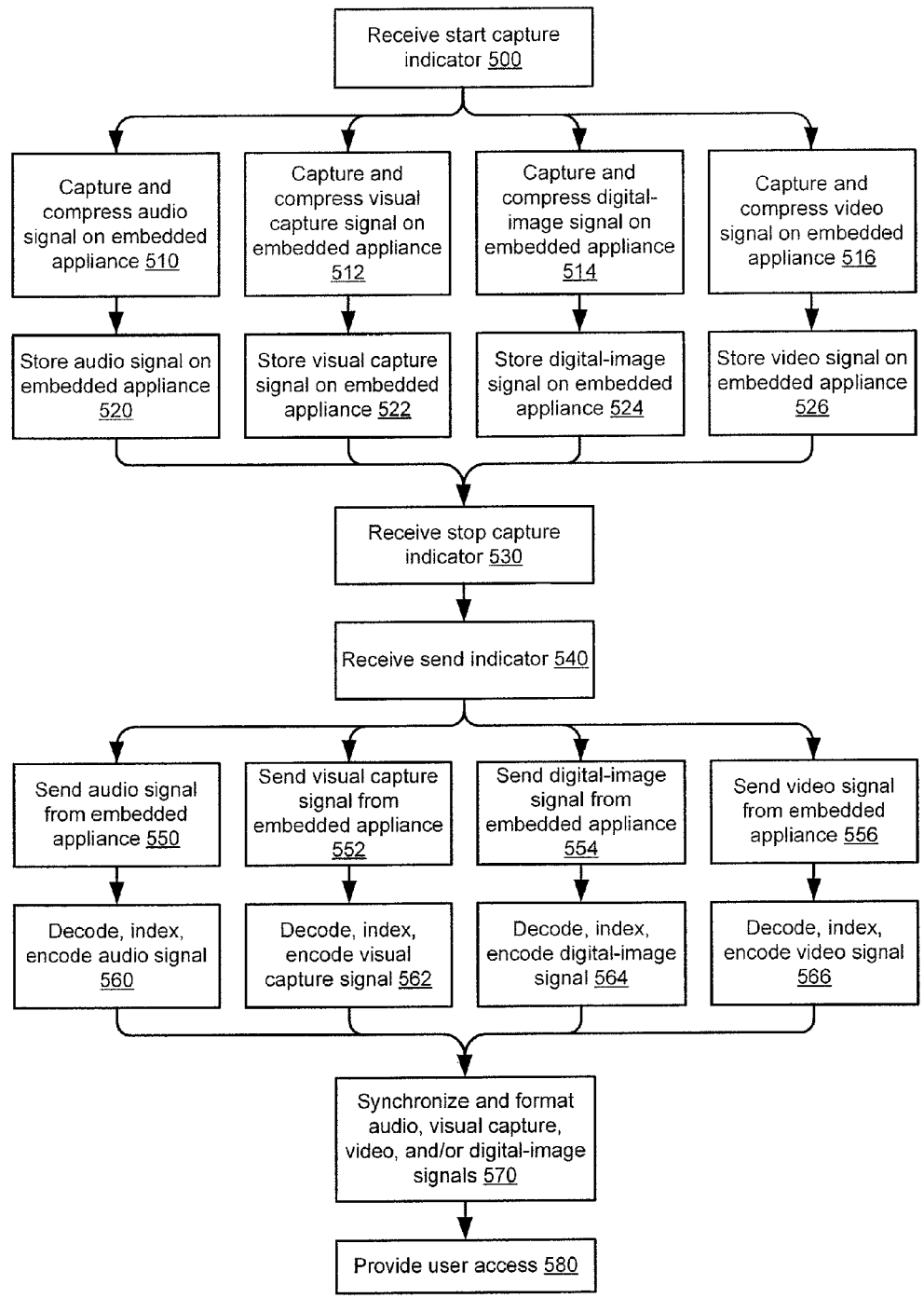
FIG. 5 is a flowchart that illustrates the capturing, processing, storing and/or sending of media signals using an embedded appliance, according to an embodiment of the invention.

FIG. 5 is a flowchart illustrating the capturing, processing, storing and/or sending of media signals using an embedded appliance according to an embodiment of the invention. The flowchart shows that the embedded appliance receives a start capture indicator at 500. The start capture indicator indicates when the embedded appliance is to capture real-time media signals. The start capture indicator at 500 can indicate that the embedded appliance is to start capturing media signals immediately upon their creation, according to a schedule, or at a subsequent user-specified time. The start capture indicator at 500 can also indicate that the embedded appliance is to capture a subset of media signals, for example, only an audio signal and a visual-capture signal.

As shown in FIG. 5, the embedded appliance captures and compresses media signals in response to the start capture indicator at 510, 512, 514 and 516. More specifically, the embedded appliance captures and compresses an audio signal at 510, a visual-capture signal at 512, a digital-image signal at 514 and a video signal at 516. Although FIG. 5 shows the capturing, processing, etc. of each of these types of media signals separately, the rest of the discussion related to FIG. 5 will make reference only to the collective media signals rather than to each individual media signal. Also, although the flowchart shows all of the media signals, the embedded appliance can capture, process, store and send any combination of the media signals. The embedded appliance can, for example, capture more than one audio signal and a single visual-capture signal without capturing a digital-image signal or a video signal.

After the media signals have been captured and compressed at 510-516, the respective captured media signals are stored on the embedded appliance at 520-526. In this embodiment, the media signals are stored locally on the embedded appliance, but in some embodiments, the media signals can be stored, for example, on a remote database that can be accessed by the embedded appliance. The flowchart shows the capturing and compressing at 510-516 and storing at 520-526 of the media signals as discrete steps, but the media signals are continuously captured and compressed at 510-516 and continuously stored at 520-526 until the embedded appliance receives a stop capture indicator at 530. The stop indicator at 530 indicates that the embedded appliance is to stop capturing, compressing and storing media signals.

The start capture indicator at 500 and the stop capture indicator at 530 can be generated by the embedded appliance or by a control server according to a schedule or according to defined criteria. In some embodiments, separate stop and start indicators can be sent to capture the different media signals. Although not shown in this flowchart, the capturing, compressing and storing of media signals can be paused and resumed at any time. The pausing can be prompted using a stop capture indicator and the resuming can be prompted by a start capture indicator generated by for example a control server or by the embedded appliance.

The embedded appliance receives a send indicator at 540 indicating that the embedded appliance is to send the stored media signals. The send indicator at 540 can be generated by the embedded appliance or by a control server according to, for example, a schedule. The send indicator at 540 can indicate that the embedded appliance is to send stored media signals immediately or at a later specified time. The send indicator at 540 can also indicate that the embedded appliance is to send only a portion of one or more stored media signals, for example, only a portion of a captured, compressed and stored digital-image signal.

The signals are sent from the embedded appliance at 550-556 in response to the send indicator received at 540. The media signals are then decoded, processed for indexing and encoded at 560-566, and synchronized and formatted at 570. Any portion of the decoding, indexing and encoding at 560-566 and synchronizing and formatting at 570 can be performed at the embedded appliance or at a control server. For example, indexing (e.g., scene detection) of a video signal can be performed at the embedded appliance before the embedded appliance sends the video signal to, for example, a control server.

After the media signals have been synchronized and formatted at 570, the media signals are made available to a user for accessing 580. The media signals are synchronized according to the markings creating during the indexing at 560-566. The media signals can be formatted into one or more types of formats. The user can access the signals at, for example, a control server and/or a server(s) (e.g., server configured as a course management system) over a network connection from a personal computer using a username and password.

In conclusion, among other things, an apparatus and method for capturing, processing, storing and/or sending media signals using an embedded appliance is described. While various embodiments of the invention have been described above, it should be understood that they have been presented by way of example only and various changes in form and details may be made. For example, processors and/or modules of an embedded appliance can be included on separate electronic boards in one or more housings.

What is claimed is:

1. An non-transitory processor-readable medium storing code representing instructions to be executed by a processor system, the code comprising code to cause the processor system to:
    receive a start indicator configured to trigger capture of a plurality of real-time signals including an audio signal on the processor system and capture on the processor system of at least one of a visual-capture signal or a digital-image signal;
    capture, in response to the start indicator, the audio signal on the processor system through a first input port to produce a first captured signal;
    capture, in response to the start indicator, the at least one of the visual-capture signal or the digital-image signal through a second input port to produce a second captured signal;
    detect a device type of a capture device coupled to the first input port;
    detect a device type of a capture device coupled to the second input port;
    compress the first captured signal based on a first compression variable and the device type of the capture device coupled to the first port to produce a first compressed signal;
    compress the second captured signal based on a second compression variable and the device type of the capture device coupled to the second port to produce a second compressed signal; and
    send, from the processing system, the first compressed signal and the second compressed signal after the first compressed signal and the second compressed signal are produced.

2. The non-transitory processor-readable medium of claim 1, wherein:
    the second compression variable is associated with at least one of a frame rate, a bit rate, a frequency, a resolution, a color or a stabilization of the at least one of the visual-capture signal or the digital-image signal.

3. The non-transitory processor-readable medium of claim 1, wherein:
    the code to compress the second captured signal includes code to compress the second captured signal into a lossy format based on the second compression variable.

4. The non-transitory processor-readable medium of claim 1, wherein:
    the code to compress the second captured signal includes code to compress the second captured signal into a first format and a second format simultaneously.

5. The non-transitory processor-readable medium of claim 1, wherein:
    the code to compress the second captured signal includes code to compress the second captured signal into a first format at a first time and into a second format at a second time different from the first time.

6. The non-transitory processor-readable medium of claim 1, the code further comprising code to cause the processor system to:
    select a first codec from a plurality of codecs of the processor system based on the device type of the capture device coupled to the first input port; and
    select a second codec from the plurality of codecs based on the device type of the capture device coupled to the second input port,
    the first captured signal being compressed using the first codec to produce the first compressed signal,
    the second captured signal being compressed using the second codec to produce the second compressed signal.

7. An non-transitory processor-readable medium storing code representing instructions to be executed by a processor system, the code comprising code to cause the processor system to:
    receive a start indicator configured to trigger capture of a plurality of real-time signals including an audio signal, a visual-capture signal and a digital-image signal of the processing system;
    capture, in response to the start indicator, the audio signal on the processor system through a first input port to produce a first captured signal;
    capture, in response to the start indicator, the visual-capture signal through a second input port to produce a second captured signal;
    capture, in response to the start indicator, the digital-image signal through a third input port to produce a third captured signal;
    detect a device type of a capture device coupled to the first input port;

detect a device type of a capture device coupled to the second input port;

detect a device type of a capture device coupled to third input port;

compress the first captured signal based on a first compression variable and the device type of the capture device coupled to the first port to produce a first compressed signal;

compress the second captured signal based on a second compression variable and the device type of the capture device coupled to the second port to produce a second compressed signal;

compress the third captured signal based on a third compression variable and the device type of the capture device coupled to the third port to produce a third compressed signal; and send, from the processor system, a signal based on the first compressed signal, the second compressed signal and the third compressed signal.

8. The non-transitory processor-readable medium of claim 7, the code further comprising code to cause the processor system to:

select a first codec from a plurality of codecs of the processor system based on the device type of the capture device coupled to the first input port;

select a second codec from the plurality of codecs based on the device type of the capture device coupled to the second input port; and select a third codec from the plurality of codecs based on the device type of the capture device coupled to the third input port;

the first captured signal being compressed using the first codec to produce the first compressed signal, the second captured signal being compressed using the second codec to produce the second compressed signal, and the third captured signal being compressed using the third codec to produce the second compressed signal.

9. The non-transitory processor-readable medium of claim 7, wherein:

each of the first compression variable, the second compression variable and the third compression variable is separately associated with at least one of a frame rate, a bit rate, a frequency, a resolution, a color or a stabilization of the at least one of the visual-capture signal or the digital-image signal.

10. The non-transitory processor-readable medium of claim 7, wherein:

at least one of the first captured signal, the second captured signal or the third captured signal is compressed into a lossy format based on the first compression variable, the second compression variable or the third compression variable, respectively.

11. The non-transitory processor-readable medium of claim 7, wherein:

at least one of the first captured signal, the second captured signal or the third captured signal is compressed into a first format and a second format simultaneously.

12. The non-transitory processor-readable medium of claim 7, wherein:

at least one of the first captured signal, the second captured signal or the third captured signal is compressed into a first format at a first time and into a second format at a second time different from the first time.

13. An apparatus, comprising:

a plurality of input ports including a first input port, a second input port and a third input port, the first input port configured to receive an audio signal, the second input port and the third input port each configured to receive a visual-capture signal or a digital-image signal; and a processor system coupled to the plurality of input ports, the processor system configured to capture the audio signal through the first input to produce a first captured signal, the processor system configured to capture at least one of a visual-capture signal or a digital-image signal through the second input port to produce a second captured signal, the processor system configured to capture at least one of a visual-capture signal or a digital-image signal through the third input port to produce a third captured signal, the processor system includes a compression module having a plurality of codecs including a first codec, a second codec and a third codec, the compression module configured to select the first codec based on a type of a capture device coupled to the first input, the compression module configured to compress the first captured signal using the first codec and based on a first compression variable to produce a first compressed signal, the compression module configured to select the second codec based on a type of a capture device coupled to the second input, the compression module configured to compress the second captured signal using the second coded and based on a second compression variable to produce a second compressed signal, the compression module configured to select the third codec based on a type of a capture device coupled to the third input, the compression module configured to compress the third captured signal using the third codec and based on a third compression variable to produce a third compressed signal, the processor system configured to send a signal based on the first compressed signal, the second compressed signal and the third compressed signal.

14. The apparatus of claim 13, wherein each of the first compression variable, the second compression variable and the third compression variable is separately associated with at least one of a frame rate, a bit rate, a frequency, a resolution, a color or a stabilization of the at least one of the visual-capture signal or the digital-image signal.

15. The apparatus of claim 13, wherein:

each of the second compression variable and the third compression variable is separately associated with at least one of a frame rate, a bit rate, a frequency, a resolution, a color or a stabilization of the at least one of the visual-capture signal or the digital-image signal, the second compressed signal having at least one of the frame rate, the bit rate, the frequency or the resolution different from the frame rate, the bit rate, the frequency or the resolution of the third compressed signal.

* * * * *